(12) United States Patent
Wen

(10) Patent No.: US 8,369,246 B2
(45) Date of Patent: Feb. 5, 2013

(54) METHOD AND APPARATUS FOR SENDING AND RECEIVING MULTICAST PACKETS ON A MULTICAST TREE

(75) Inventor: Haibo Wen, Shanghai (CN)

(73) Assignee: Alcatel Lucent, Paris (FR)

( * ) Notice: Subject to any disclaimer, the term of this patent is extended or adjusted under 35 U.S.C. 154(b) by 62 days.

(21) Appl. No.: 12/450,555

(22) PCT Filed: Feb. 4, 2008

(86) PCT No.: PCT/CN2008/000302
§ 371 (c)(1),
(2), (4) Date: Mar. 15, 2010

(87) PCT Pub. No.: WO2008/131634
PCT Pub. Date: Nov. 6, 2008

(65) Prior Publication Data
US 2011/0064077 A1   Mar. 17, 2011

(30) Foreign Application Priority Data

Apr. 30, 2007   (CN) .......................... 2007 1 0040396

(51) Int. Cl.
*H04L 12/28*   (2006.01)
(52) U.S. Cl. .......................... 370/256; 370/351; 370/390
(58) Field of Classification Search .......... 370/254–258, 370/351, 389–390, 398
See application file for complete search history.

(56) References Cited

U.S. PATENT DOCUMENTS

| | | | | |
|---|---|---|---|---|
| 5,878,232 A * | 3/1999 | Marimuthu | ................... | 709/249 |
| 5,956,335 A * | 9/1999 | Backes et al. | ................. | 370/392 |
| 6,032,194 A * | 2/2000 | Gai et al. | ...................... | 709/239 |
| 6,188,694 B1 * | 2/2001 | Fine et al. | ..................... | 370/402 |
| 7,760,668 B1 * | 7/2010 | Zinjuvadia | ................... | 370/256 |
| 2004/0205215 A1* | 10/2004 | Kouvelas et al. | ............. | 709/231 |
| 2005/0180391 A1* | 8/2005 | Shimada | ..................... | 370/351 |
| 2007/0211730 A1 | 9/2007 | Cuthbert et al. | | |
| 2007/0230370 A1 | 10/2007 | Luo | | |

FOREIGN PATENT DOCUMENTS

| | | |
|---|---|---|
| CN | 1747446 | 3/2006 |
| CN | 1848820 | 10/2006 |
| CN | 1937569 | 3/2007 |

OTHER PUBLICATIONS

International Search Report May 22, 2008, 4 pages.

* cited by examiner

*Primary Examiner* — Ayaz Sheikh
*Assistant Examiner* — Mounir Moutaouakil
(74) *Attorney, Agent, or Firm* — Harness, Dickey & Pierce, P.L.C.

(57) ABSTRACT

The present invention relates to a solution for taking a network equipment in a communication network as a root node to generate a logical topology tree for a subscriber terminal which requests the sending of multicast packets, and then generating a multicast tree on the logical topology tree with the network device as the root node, so as to forward the multicast packets. With the solution of sending a multicast packet to the subscriber terminal, it can effectively save the network bandwidth resource and reduce the transmission delay of multicast packet.

14 Claims, 19 Drawing Sheets

METHOD AND APPARATUS FOR SENDING AND RECEIVING MULTICAST PACKETS ON A MULTICAST TREE

TECHNICAL FIELDS

The present application relates to a communication network, and in particular relates to a method and apparatus for sending and receiving multicast packets in a communication network.

BACKGROUND ART

In an access network, multicast (MC) technology has been widely used to deliver multicast service flows (e.g., a multicast service in an interactive network Television (IPTV)) from an operator side to subscriber networks. Upstream MC (i.e. multicast data from the subscriber subnet) is not allowed. The access device just discards the multicast data from the subscriber networks. However, the multicast in the subscriber networks is sure to exist. For example, a user in the subscriber networks intends to multicast his/her existing video or live performance to his/her friends and relatives; or the headquarters multicast a CEO's speech to his branches. On the other hand, network operators would like to provide more value-added services to attract more subscribers to thereby earn more profits, thus the network operators earnestly need a solution that can effectively support Upstream MC (UP-MC) services.

Currently, there exist several UP-MC solutions, one being that the subscriber terminal unicasts the service data to be sent to multiple receivers, respectively; and the other being that the subscriber terminal unicasts the service data to be sent to a server in the network, and then it is the server that forwards the multicast packets of the service data.

Currently, in the access network, the Spanning Tree Protocol (STP, see IEEE 802.d standard for details) or Rapid Spanning Tree Protocol (RSTP, see IEEE 802.w standard for details) are widely supported, wherein a device at the network side and remote from the subscriber network is taken as a root node, thereby generating a spanning tree, then the multicast packets from the network side are sent on the spanning tree. As to the access network shown in FIG. 1, the Broadband Remote Access Server (BRAS) connected at the network side is the root of the spanning tree. For a UP-MC from the subscriber terminal UE1, the solution is as follows: a access device A1 transmits the multicast packets along the existing spanning tree to S1, and then S1 transmits it along the spanning tree path to the subscriber terminals UE2 and UE3 that receive the multicast packets. Or, the subscriber terminal UE1 transmits the multicast packets to the access device A1 thereof, then the access device A1 tunnels the multicast packets to the network device (for example BNG, Broad Network Gateway) close to the root node of the spanning tree, and then the BNG forwards the packets on the existing spanning tree.

In the above solutions, the UP-MC and other services (unicast service, IPTV service) share a common logic topology which is derived by calculating the STP or the RSTP. For the UP-MC services, the path from the UP-MC sending end to the corresponding receiving end is not a better one. For example, as far as the UP-MC receiving subscriber terminal UE2 under the access device A2 is concerned, the best path from the UP-MC sending subscriber terminal UE1 under the access device A1 to the MP-US receiving subscriber terminal UE2 is A1-S4-S5-A2, rather than A1-S2-S1-S3-S4-S5-A2, or A1-S2-S1-BNG-S1-S3-S4-S5-A2.

The above UP-MC solutions waste much network bandwidth with a greater transmission delay.

SUMMARY OF THE INVENTION

To overcome the above drawbacks in the prior art, there is provided a solution for taking a network equipment in a communication network as a root node to generate a logical topology tree for a subscriber terminal which requests the sending of multicast packets, and then generating a multicast tree on the logical topology tree with the network device as the root node, so as to forward the multicast packets.

According to the first aspect of the present invention, there is provided a method, in a network device of a communication network, for multicasting a multicast packet from the subscriber terminal, including the steps of: b. generating a logical topology tree with the network device as a root node; c. generating a multicast tree on the logical topology tree with the network device as the root node; d. forwarding the multicast packet on the multicast tree.

According to the second aspect of the present invention, there is provided a method, in a network device of a communication network, for forwarding a report message on reception of the multicast packet by the subscriber terminal accessed to the communication network via the network device, including the steps of: ii. receiving the report message on reception of the multicast packet from the subscriber terminal, the report message including a multicast identification of the multicast packet received by the subscriber terminal; iii. selecting a logical topology tree identification corresponding to the multicast identification in the report message based on the pre-stored multicast identification and its corresponding logical topology tree identification information; iv. adding the corresponding logical topology tree identification to the report message to thereby obtain a report message with a logical topology tree identification; v. sending the report message with the logical topology tree identification on the upstream port connected to the logical topology tree identified by the logical topology tree identification to the network device connected to the upstream port.

According to the third aspect of the present invention, there is provided a method for assisting a subscriber terminal in sending a multicast packet in a multicast management device of a communication network, including the steps of: C. sending a multicast identification assigned to a subscriber terminal requesting to send the multicast packet and a corresponding logical topology tree identification to a network device which sends the multicast packet, and sending the multicast address to the subscriber terminal.

According to the fourth aspect of the present invention, there is provided a method for assisting a subscriber terminal in receiving a multicast packet in a multicast management device of a communication network, including the steps of: I. receiving a second requesting message from the subscriber terminal for requesting to receive the multicast packet; II. determining the multicast identification of the multicast packet that is requested to be received by the subscriber terminal and its corresponding logical topology tree identification based on the second requesting message; III. sending the multicast identification and its corresponding topology tree identification to an access device which accesses the subscriber terminal to the network, and sending the multicast identification to the subscriber terminal.

According to the fifth aspect of the present invention, there is provided a method, in a user terminal of the communication network, for obtaining a multicast identification for sending a multicast packet, including the steps of:—sending to a multicast management means a first requesting message for requesting to send the multicast packet;—receiving from the multicast management means the multicast identification for sending the multicast packet;—sending the multicast packet by using the multicast identification.

According to the sixth aspect of the present invention, there is provided a multicasting device in a network device of a communication network, for multicasting a multicast packet from the subscriber terminal, comprising first generating means for generating a logical topology tree with the network device as a root node; second generating means for generating a multicast tree on the logical topology tree with the network device as the root node; and forwarding means for forwarding the multicast packet on the multicast tree.

According to the seventh aspect of the present invention, there is provided a report message forwarding device in a network device of a communication network, for forwarding a message reporting reception of the multicast packet by the subscriber terminal accessed to the communication network via the network device, including third receiving means for receiving the message reporting reception of the multicast packet from the subscriber terminal, the report message including a multicast identification of the multicast packet received by the subscriber terminal; selecting means for selecting a logical topology tree identification corresponding to the multicast identification in the report message based on the pre-stored multicast identification and its corresponding logical topology tree identification information; adding means for adding the corresponding logical topology tree identification to the report message to thereby obtain a report message with a logical topology tree identification; third sending means for sending the report message with the logical topology tree identification on the upstream port connected to the logical topology tree identified by the logical topology tree identification to the network device connected to the upstream port.

According to the eighth aspect of the present invention, there is provided a sending assistance device for assisting a subscriber terminal in sending a multicast packet in a multicast management device of a communication network, comprising fourth sending means for sending a multicast identification assigned to a subscriber terminal requesting to send the multicast packet and a corresponding logical topology tree identification to a network device which sends the multicast packet, and sending the multicast address to the subscriber terminal.

According to the ninth aspect of the present invention, there is provided a receiving assistance device for assisting a subscriber terminal in receiving a multicast packet in a multicast management device of a communication network, comprising fifth receiving means for receiving a second message from the subscriber terminal for requesting to receive the multicast packet; second determining means for determining the multicast identification of the multicast packet that is requested to be received by the subscriber terminal and its corresponding logical topology tree identification based on the second requesting message; and fifth sending means for sending the multicast identification and its corresponding topology tree identification to an access device which accesses the subscriber terminal to the network, and sending the multicast identification tot the subscriber terminal.

According to the tenth aspect of the present invention, there is provided a multicast identification obtaining means in a user terminal of the communication network, for obtaining a multicast identification for sending a multicast packet, comprising sixth sending means for sending to a multicast management means a first requesting message for requesting to send the multicast packet; sixth receiving means for receiving from the multicast management means the multicast identification for sending the multicast packet; and seventh sending means for sending the multicast packet by using the multicast identification.

With the solution of sending a multicast packet for a subscriber terminal as provided in the present invention, it can effectively save the network bandwidth resources and reduces the multicast packet transmission delay.

BRIEF DESCRIPTION OF THE DRAWINGS

Other features, objectives and advantages of the present invention will become more apparent by reading the detailed descriptions for the non-limiting embodiments with reference to the accompanying drawings as follows.

PREFERRED EMBODIMENTS OF THE PRESENT INVENTION

The basic principle of the present invention is that a network device takes itself as a root node to generate a logical topology tree for a subscriber terminal that requests to send a multicast packet, and then generate a multicast tree on the logical topology tree with the network device itself as the root node, to thereby forward the multicast packet. The concept "logical topology tree" here refers to a tree topological structure which takes the network device as a root node and is connected to each other network device in a network where the network device is located. A topology path of the multicast tree, which is established on the logical topology tree, is a subset of the topology path of the logical topology tree.

Figure 1:
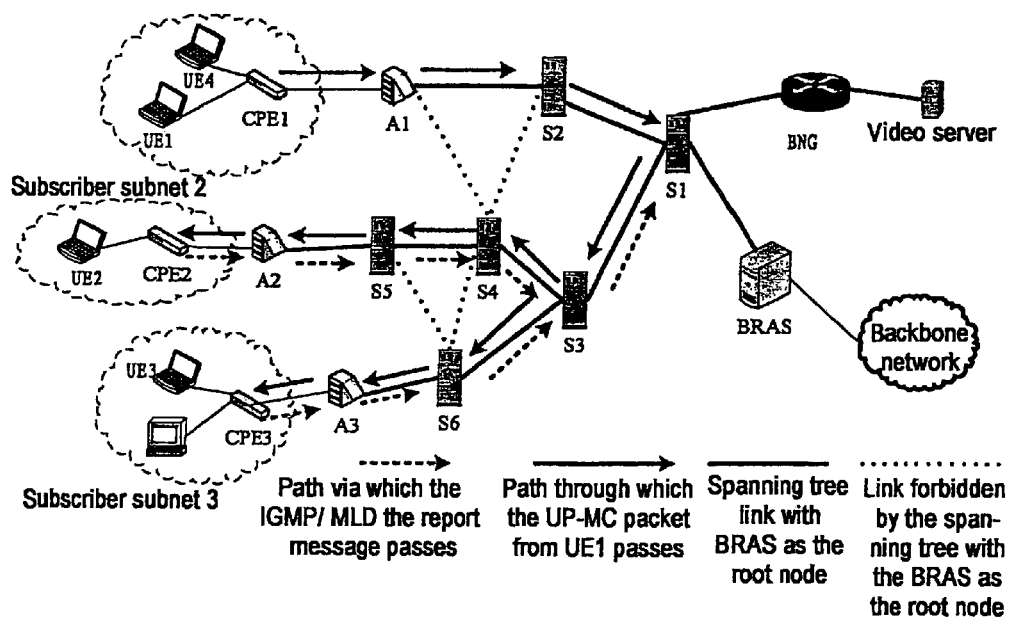
FIG. 1 shows a schematic diagram of the forwarding path of a multicast packet from a subscriber terminal in the prior art.
Figure 2:
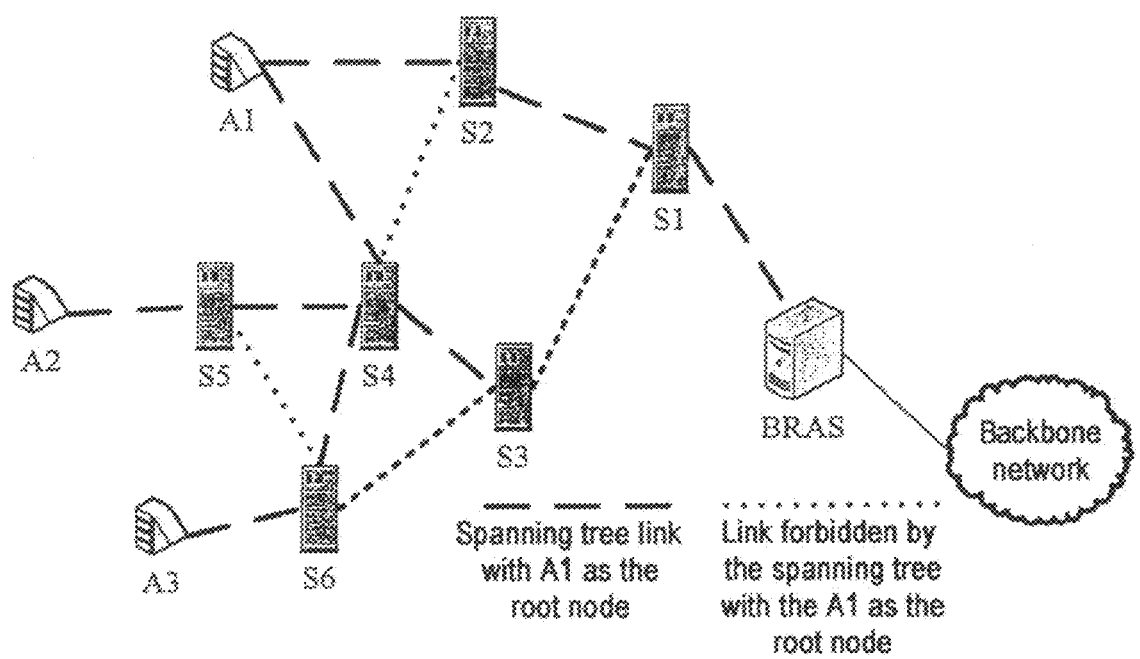
FIG. 2 shows a schematic diagram of a link of generating a logical topology tree with an access device as the root node in an access network according to a specific embodiment of the present invention.

For the network topology structure shown in FIG. 1, when the subscriber terminal UE1 accessed to the network via the access device A1 needs sending the multicast packet, a logical topology tree is generated with the access device A1 as the root node, and as shown in FIG. 2, the logical topology tree may comprise the shortest path tree (i.e. the number of intermediary network devices from the root node network device to each leaf node network device is the minimal) and is configured with the use of the spanning tree generated by the Spanning Tree Protocol (STP, for details, refer to the IEEE 802.d standard) or Rapid Spanning Tree Protocol (RSTP, for details, refer to the IEEE802.w standard), or variations of the shortest path tree and the spanning tree, or other possible forms of logical topology tree or manually configured by the network administrator. The forms of the logical topology tree here are not limited.

Figure 3:
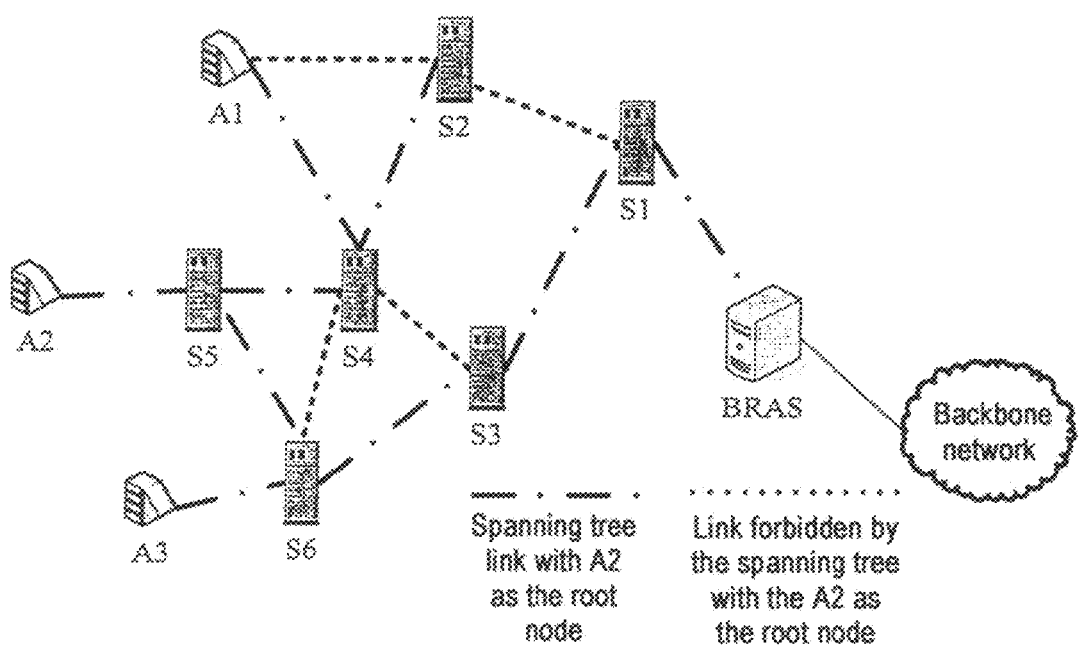
FIG. 3 shows a schematic diagram of another link of generating a logical topology tree with an access device as the root node in an access network according to a specific embodiment of the present invention.

When the subscriber terminal UE2 accessed to the network via the access device A2 needs sending a multicast packet, a logical topology tree is generated with the access device A2 as the root node, and as shown in FIG. 3, the form of the logical topology tree in FIG. 3 is only exemplary. In fact, the concrete forms of the generated logical topology tree are not limited. Of course, it is not limited here to take the access device A2 as the root node to generate the logical topology tree and the multicast tree. For the network topology structure as shown in FIG. 3, it can also take the network device S5 (which can be a switch) as the root node to generate the logical topology tree and the multicast tree.

Figure 4:
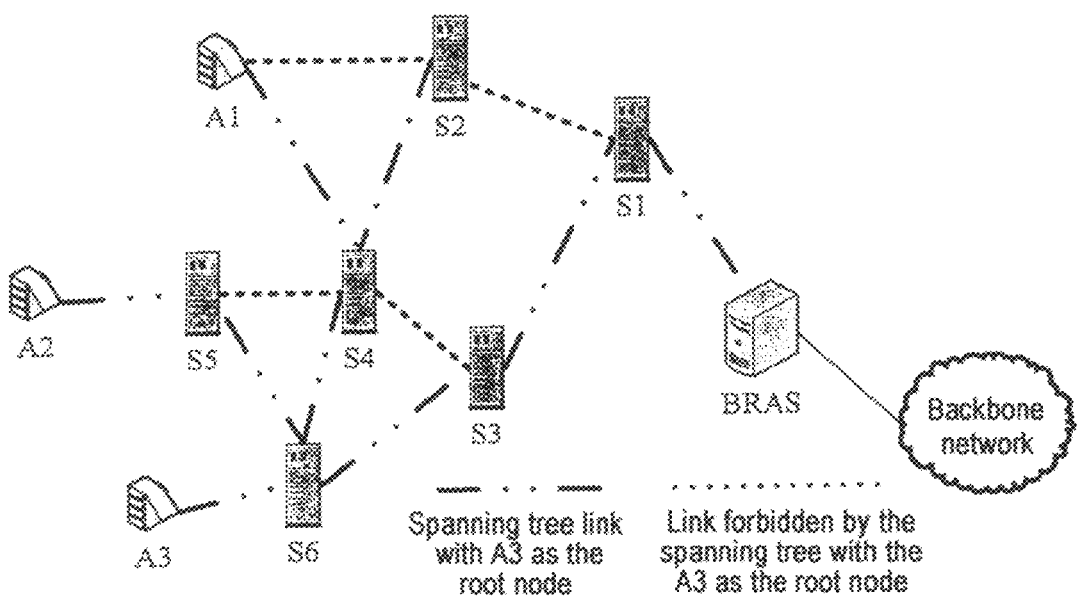
FIG. 4 shows a schematic diagram of still another link of generating a logical topology tree with an access device as the root node in an access network according to a specific embodiment of the present invention.

When the subscriber terminal UE3 accessed to the network via the access device A3 needs sending a multicast packet, a logical topology tree is generated with the access device A3 as a root node, as shown in FIG. 4, and likewise the specific forms of the generated logical topology tree are not limited. Of course, it is not limited here to take the access device A3 as the root node to generate the logical topology tree and the multicast tree. For the network topology structure as shown in FIG. 4, it can also take the network device S6 (which can be a switch) as the root node to generate the logical topology tree and the multicast tree.

Figure 5:
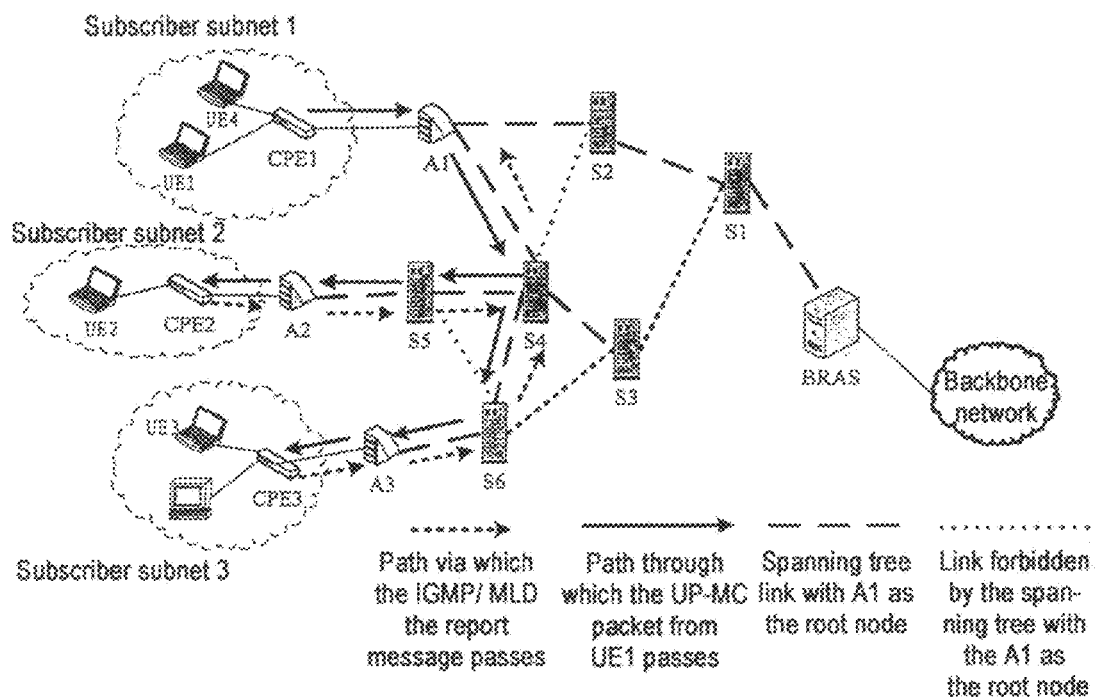
FIG. 5 shows a schematic diagram of a forwarding path of a multicast packet from a subscriber terminal according to a specific embodiment of the present invention.

FIG. 5 shows the schematic diagram of the path through which the IGMP (Internet Group Management Protocol, for details, see RFC1112 (IGMP v1), RFC2236 (IGMP v2), applicable to IPv4) or MLD (Multicast Listener Discovery, for details, see RFC2710, applicable to IPv6) report message is sent to the root node Al from the subscriber terminal on the logical topology tree established with Al as the root node and the path for forwarding the multicast packet.

When there are multiple logical topology trees in the communication network, it is necessary to distinguish different logical topology trees by using different identifications, for example, for a two-layer communication network of an access network, different VLANs can be used to separate logical topology trees. In other words, VLAN identifications are used to identify the logical topology trees. Of course, the present invention is not limited to this, and other existing identifications or the identifications customized by the operators can also be used to distinguish or separate different topology trees.

When there are multiple subscriber terminals accessed to the network via the access device A1 to send a multicast packet, for example the subscriber terminal UE4 also sends a multiple packet, A1 can regenerate a logical topology tree for the multicast packet from the UE4, which is identified by a different logical topology tree identification. Or the multicast packet from the UE4 is forward on the existing logical topology tree generated for the multicast packet from the UE1.

In the case that the logical topology tree is a spanning tree (STP or RSTP), if VLANs are used to identify different spanning trees, when there are multiple subscriber terminals in the subscriber subnet of A1 to send a multicast packet, there would have two mechanisms for forwarding the multicast packet, one being based on a Multiple Spanning Tree Instance (MSTI, for details, see IEEE802.1s), and the other being based on Per VLAN Spanning Tree (PVST, for details, see RFC2637). For example, when the UE1 accessed to the network via the A1 is to send a multicast packet, the UE1 initiates a request to a multicast management device which then assigns a multicast address to the UE1 and notifies it to the UE1 and A1, and, at the same time, assigns, a. spanning tree identification VLAN1 to the multicast process and notifies A1 to generate a spanning tree with itself as the root node within the VLAN1 domain. If UE4 is also to send a multicast packet, in the case of the MSTI, a plurality of multicast processes share the above spanning tree; in the case of the PVST, a spanning tree is generated for each multicast process within different VLAN domains, with different VLAN identifications to identify the spanning trees, i.e. using different VLANs to separate different spanning trees.

Figure 6:
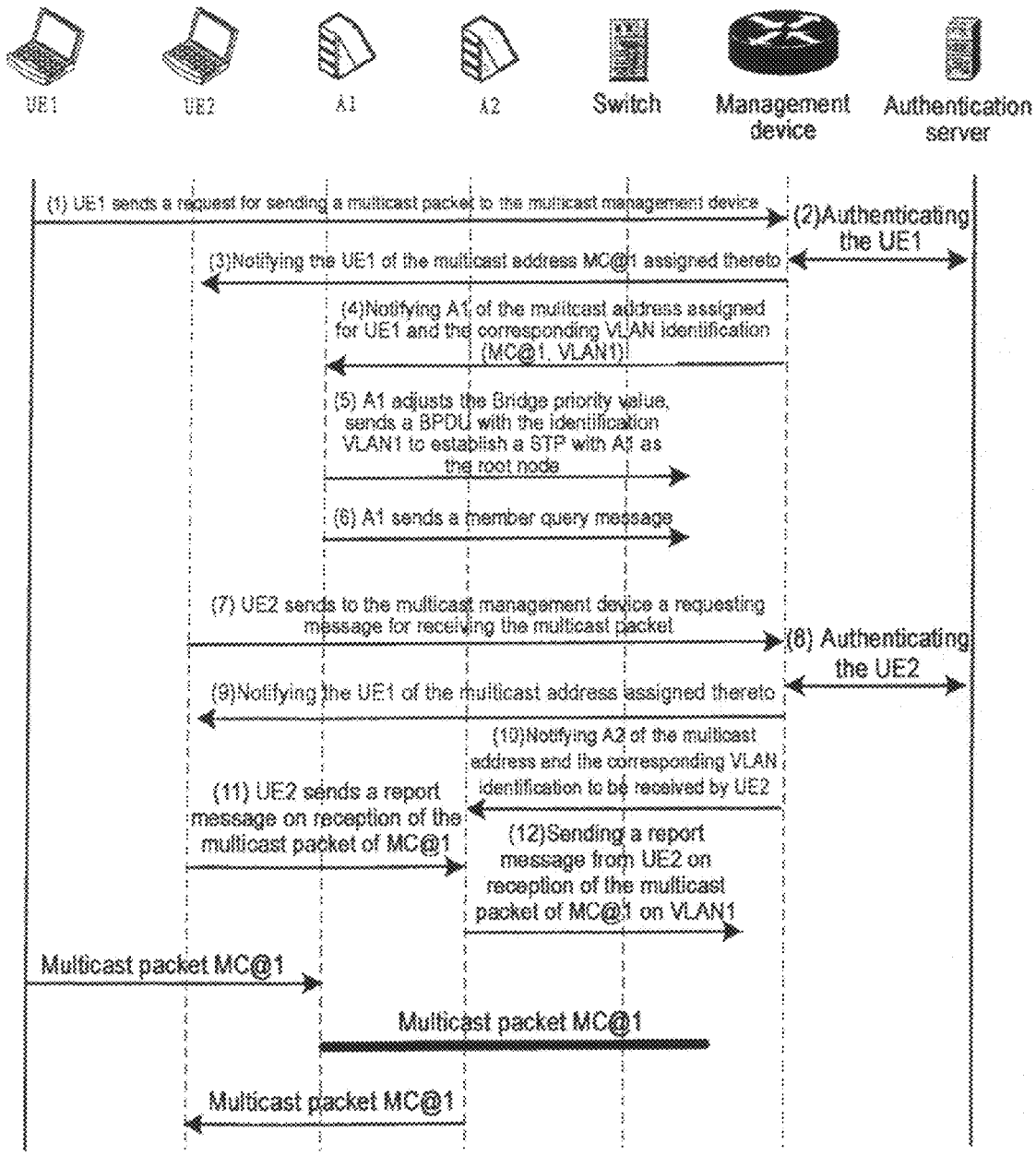
FIG. 6 shows a system flow chart of the sending process of a multicast packet according to a specific embodiment of the present invention.

FIG. 6 shows a system flow diagram of a PVST-based multicast packet forwarding mechanism to send a multicast packet, specifically as follows:

(1) A subscriber terminal UE1 sends a requesting message of sending a multicast packet to a multicast management device.

(2) After the multicast management device receives from the subscriber terminal UE1 the requesting message of sending the multicast packet, the multicast management device authenticates the subscriber based on the relevant information carried in the requesting message, for example based on the data link layer address of the subscriber terminal, such as the MAC address or the network layer address, IP address or token or payment records, etc., to determine whether the subscriber terminal UE1 has the right to send the multicast packet. This authentication process can be completed by the multicast management device per se, or by an authentication server or other servers.

(3) When the subscriber terminal UE1 passes the authentication, the multicast management device assigns it a multicast address MC@1 and notifies the subscriber terminal UE1 of the multicast address MC@1 assigned thereto.

(4) The multicast management device assigns a VLAN identification VLAN1 to the corresponding multicast address MC@1, and notifies the access device A1 of the MC@1 assigned to the subscriber device UE1 and the corresponding VLAN1.

(5) After receiving the notification message from the multicast management device, the access device A1 sets its Bridge ID with a high priority (such that the access device A1 is a root node of the spanning tree within the VLAN1), and then sends a BPDU with the VLAN1 identification and having a high priority to other switch devices in the network so as to establish a spanning tree. Here, a spanning tree with the access device A1 as the root node is generated in conformity with the STP protocol or the RSTP protocol, and the skilled in the art would know the establishment process of a spanning tree, and thus the present invention will not provide the details here.

(6) When the spanning tree with the access device A1 as the root node has been established, the access device A1 periodically sends in a corresponding spanning tree an IGMP or MLD query message to other network devices. After receiving the query message, the other network devices send it along the path of the spanning tree till to each subscriber terminal.

After receiving the query message, the subscriber terminal to receive the multicast packet sent by the subscriber terminal UE1 will respond with an IGMP or MLD report message, and its access device will forward the report message along the path of the spanning tree to the previous-hop network device and establish a mapping relationship between the port receiving the report message and the multicast address in the report message. Each network device forwards the report message hop by hop to the root node access device A1 and establishes a mapping relationship between the port receiving the report message and the multicast address in the report message. Likewise, after receiving the above report message, the receiving device A1 establishes a mapping relationship between the port receiving the report message and the multicast address in the report message, thereby completing the process of establishing the multicast tree.

Steps (1) to (6) illustrate the processes of establishing a spanning tree and a multicast tree with the access device A1 as a root node. Steps (7) to (12) as follows illustrate a requesting process of the subscriber terminal UE2 for requesting to receive the multicast packet from the subscriber terminal UE1

(7) The subscriber terminal UE2 sends a requesting message to receive a multicast packet to the multicast management device. For example, there is a subscriber terminal UE1 in a certain webpage to provide a multicast service, and when a subscriber 2 finds a link for the subscriber terminal UE1 to provide the multicast service on that webpage, he/she will click on the link to send a requesting message.

(8) After receiving the requesting message to receive the multicast packet from the subscriber terminal UE2, the multicast management device authenticates the subscriber based on the relevant information carried in the requesting message, for example based on the data link layer address of the subscriber terminal, such as the MAC address or the network layer address, IP address or token or payment records, etc., to determine whether the subscriber terminal UE2 has the right to receive the multicast packet. This authentication process can be completed by the multicast management device per se, or by an authentication server or other servers.

(9) When the subscriber terminal UE2 passes the authentication, the multicast management device notifies the subscriber terminal UE2 of the multicast address MC@1 of the multicast packet which is requested to be received.

(10) The multicast management device notifies the access device A2 of the multicast address MC@1 and its corresponding VLAN1 of the multicast packet which is requested to be received by the subscriber terminal UE2.

(11) After receiving the notification message from the multicast management device, the subscriber terminal UE2 sends an IGMP or MLD report message to the access device A2 based on the multicast address MC@1 information in the notification message.

(12) The access device A2 receives the report message from the subscriber terminal UE2, selects a corresponding spanning tree identification VLAN1 based on the multicast address MC@1 of the multicast packet received by the subscriber terminal UE2, adds the identification VLAN1 to the report message, and is then connected to the upstream port of the spanning tree identified by the identification VLAN1 to thereby send the report message with the identification VLAN1 to the previous hop network device. Here, the concept of upstream port refers to a port connected to the spanning tree identified by the VLAN1 and close to the root node of the spanning tree.

Other network device connected with the spanning tree identified by the VLAN1 forwards the report message hop by hop along the path of the spanning tree to the root node access device A1, and establishes a mapping relationship between the port receiving the report message and the multicast address in the report message. Likewise, after receiving the above report message, the access device A1 establishes a mapping relationship between the port receiving the report message and the multicast address in the report message, thereby completing the establishment of a multicast tree. The multicast packet from the subscriber terminal UE1 is transmitted along the existing multicast tree path, i.e. the reverse path of the above report message, to each terminal receiving the multicast packet. It should be noted here that the multicast path of the above multicast tree is dynamically varied since the subscriber terminal can stop or start receiving the multicast packet at any time. Thus, the access device A1 will periodically send an IGMP or MLD query message, and each subscriber terminal, upon receiving the IGMP or MLD query message, will send an IGMP or MLD report message which arrives at the root node access device A1 via other network device.

It should be noted here that if there are still a plurality of network devices between the root node of the logical topology tree and the subscriber terminal which sends a multicast packet, the multicast management device further needs to notify the multicast address and the VLAN identification assigned to the subscriber terminal to the plurality of network devices, and each network device, upon receiving the multicast packet from the subscriber terminal, forwards the multicast packet hop by hop to the root node network device. In the case of taking the network device S5 (or the network device S6) as the root node to generate a logical topology tree and then generating a multicast tree on the logical topology tree with the network device S5 (or the network device S6) as the root node so as to forward the multicast packet, as shown in FIG. 3 (or FIG. 4), the multicast management device is also required to notify the multicast address and VLAN identification assigned to the subscriber terminal UE2 (or the subscriber terminal UE3) to the access device A2 (or the access device A3). When the subscriber terminal UE2 (or the subscriber terminal UE3) sends the multicast packet, the access device A2 (or the access device A3) determines whether the multicast packet from the subscriber terminal UE2 (or the subscriber terminal UE3) is allowed based on the multicast address and VLAN identification obtained from the multicast management device, and sends it to the network device S5 (or the network device S6).

It should be further noted that, the multicast management device may be located in any network device in the access network as shown in FIG. 6, or in a server outside the access network.

The foregoing describes a preferred embodiment of the present invention, wherein the steps (2) and (8) of authenticating the subscriber terminals UE1 and UE2 are not essential steps. The above flow is applicable to the circumstance of forwarding the multicast packet based on the PVST mechanism, or the case of sending the multicast packet for the first multicast source by the access device A1 based on the MSTI mechanism. As far as on the basis of MSTI mechanism is concerned, when there are a plurality of subscriber terminals to send a multicast terminal in a subscriber subnet under the access device A1, the access device A1 only needs to generate a spanning tree for the first multicast source, and for the subsequent multicast sources, it is unnecessary to re-generate a spanning tree, which can share the spanning tree generated for the first multicast source, and thus step (5) as shown in FIG. 6 can be eliminated.

Figure 7:
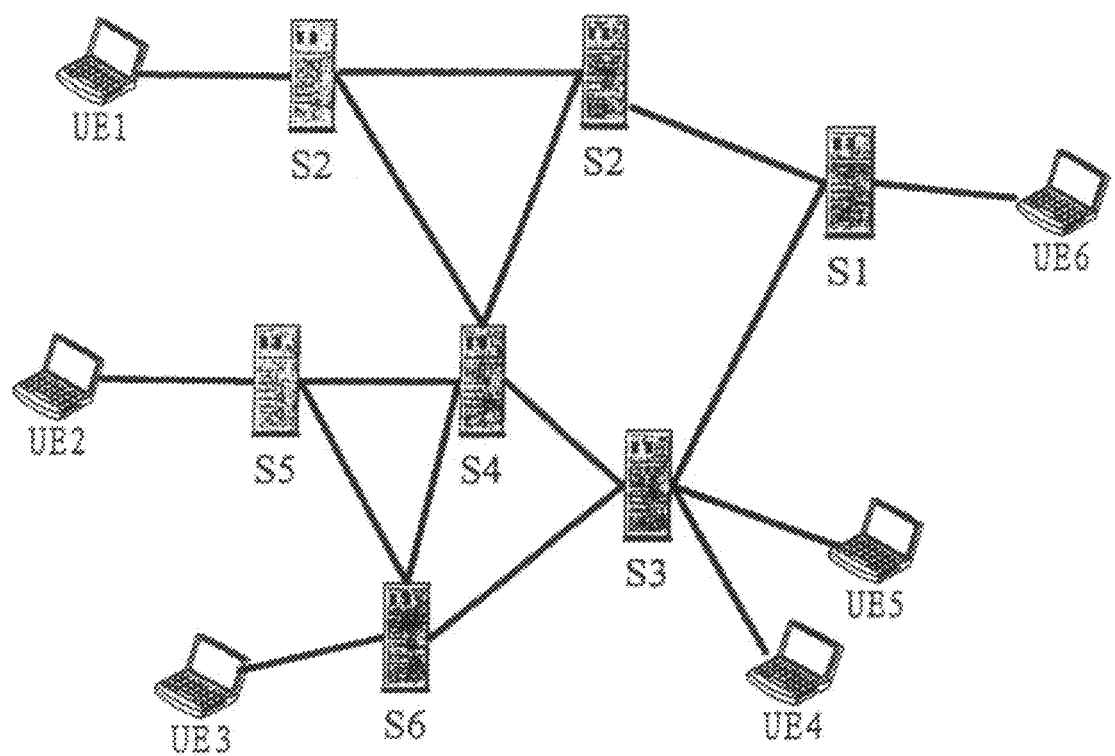
FIG. 7 shows a schematic diagram of an application scenario of the present invention.

Likewise, the present invention is not limited to the access network as shown in FIGS. 1 to 5, and a person of normal skill in the art would appreciate that the local area network (LAN) shown in FIG. 7 is also applicable to the present invention, for example.

Figure 8:
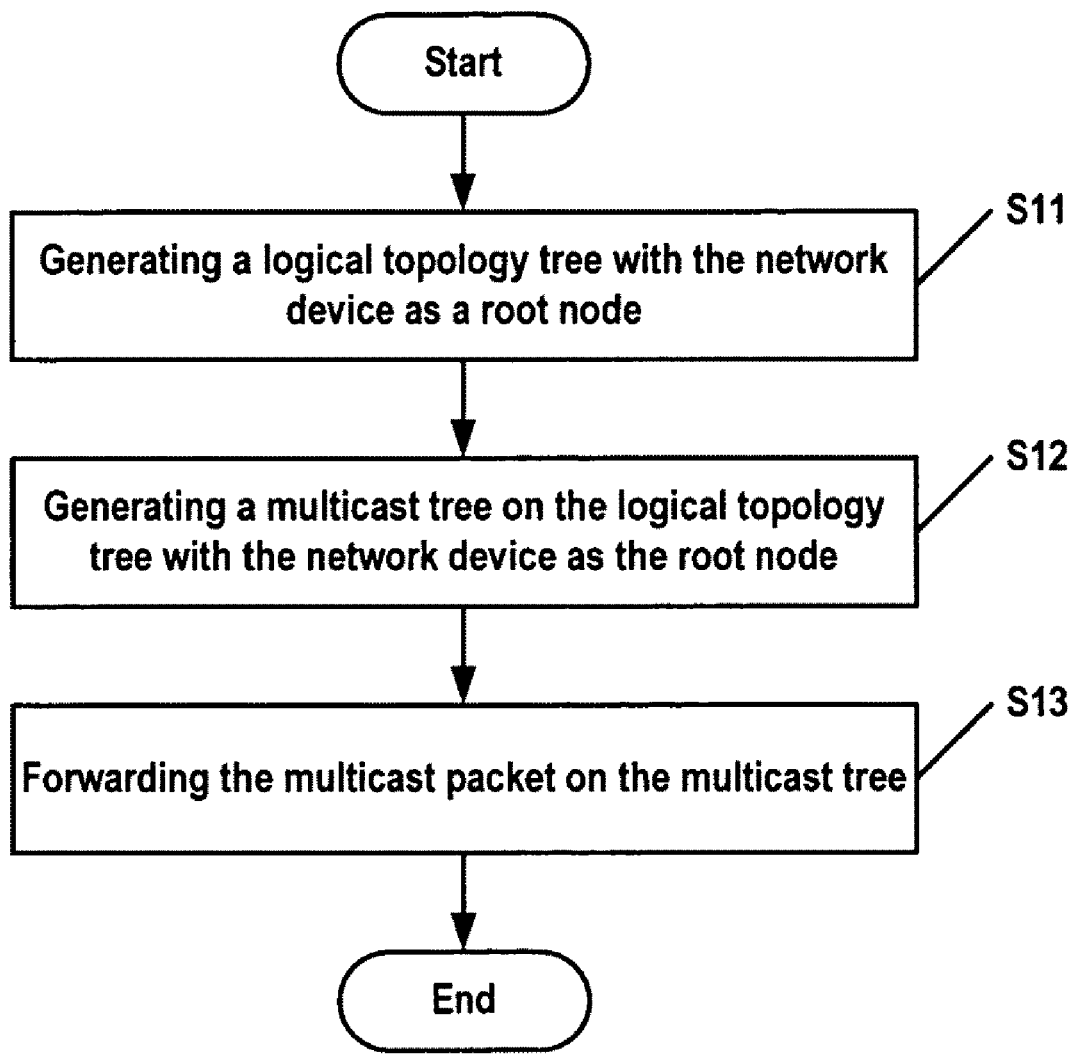
FIG. 8 shows a schematic diagram of a flow chart of a method for multicasting a multicast packet from a subscriber terminal in a network device of a communication network according to a specific embodiment of the present invention.

FIG. 8 shows a diagram of a flow chart of a method for multicasting a multicast packet from a subscriber terminal in a network device of a communication network according to a specific embodiment of the present invention. Firstly, at step S11, a logical topology tree is generated with the network device as a root node. Then, at step S12, a multicast tree is generated on the logical topology tree with the network device as a root node. Finally, the multicast packet is forwarded on the multicast tree. Of course, steps S11-S13 describe the circumstance that the network device initiatively generates a logical topology tree and a multicast tree for a multicast packet from a subscriber terminal. Preferably, generation of the logical topology tree and the multicast tree may be requested to be established by the subscriber . terminal, or as shown in FIG. 6, the network device generates the logical topology tree and the multicast tree after receiving the notification message from the multicast management device.

Figure 9:
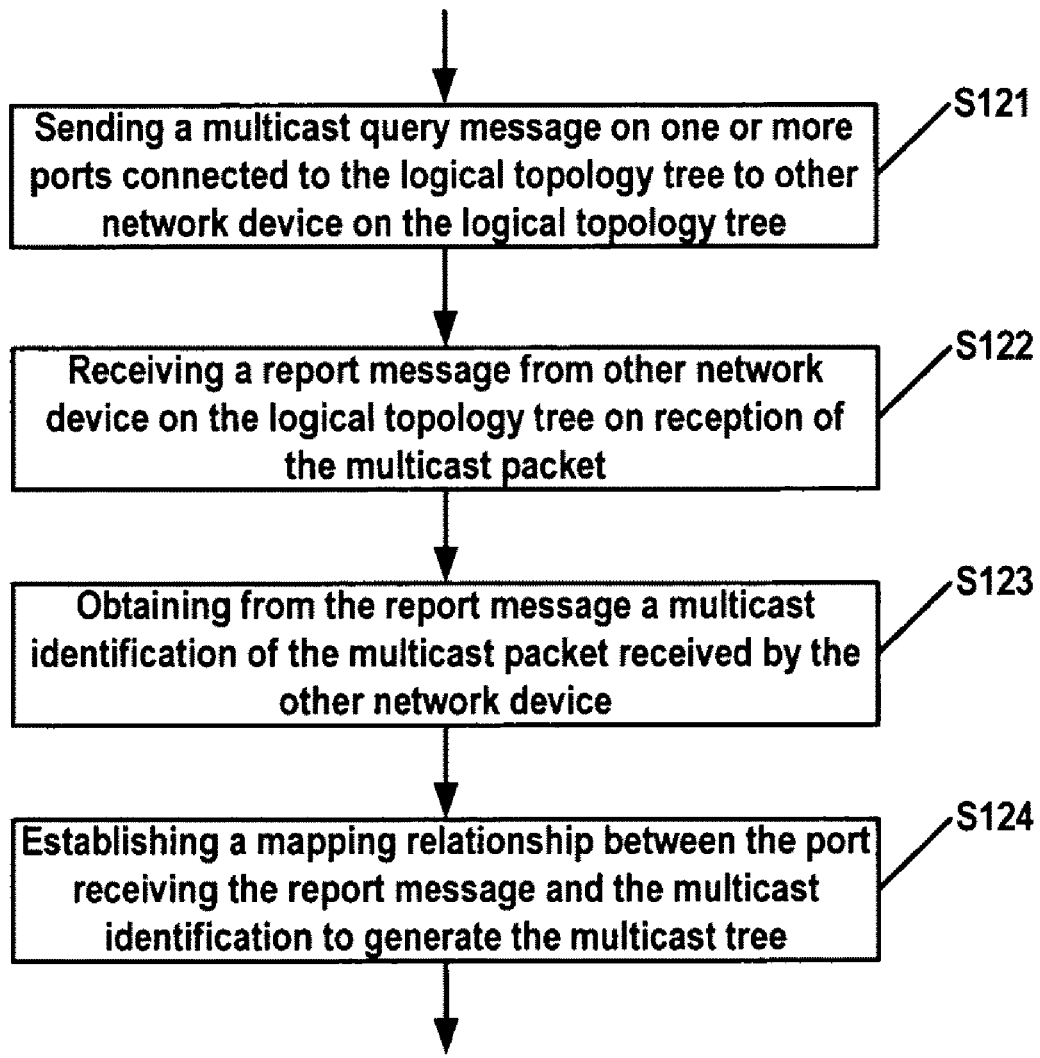
FIG. 9 shows a flow chart of a method for establishing a multicast tree on a logical topology tree in a network device of the communication network according to a specific embodiment of the present invention.

FIG. 9 shows a specific embodiment of step S12 as shown in FIG. 8. Firstly, at step S121, a multicast query message is sent on one or more ports connected to the logical topology tree to other network device on the logical topology tree. Secondly, at step S122, the report message of the other network device on the logical topology tree that receives the multicast packet is received. And then at step S123, the multicast identification of the multicast packet received by the other network device is obtained from the report message. Finally, at step S124, a mapping relationship between the port receiving the report message and the multicast identification is established to generate the multicast tree. In the case that the subscriber terminal which receives the multicast packet voluntarily issues the report message, the step S121 may be eliminated too.

Figure 10:
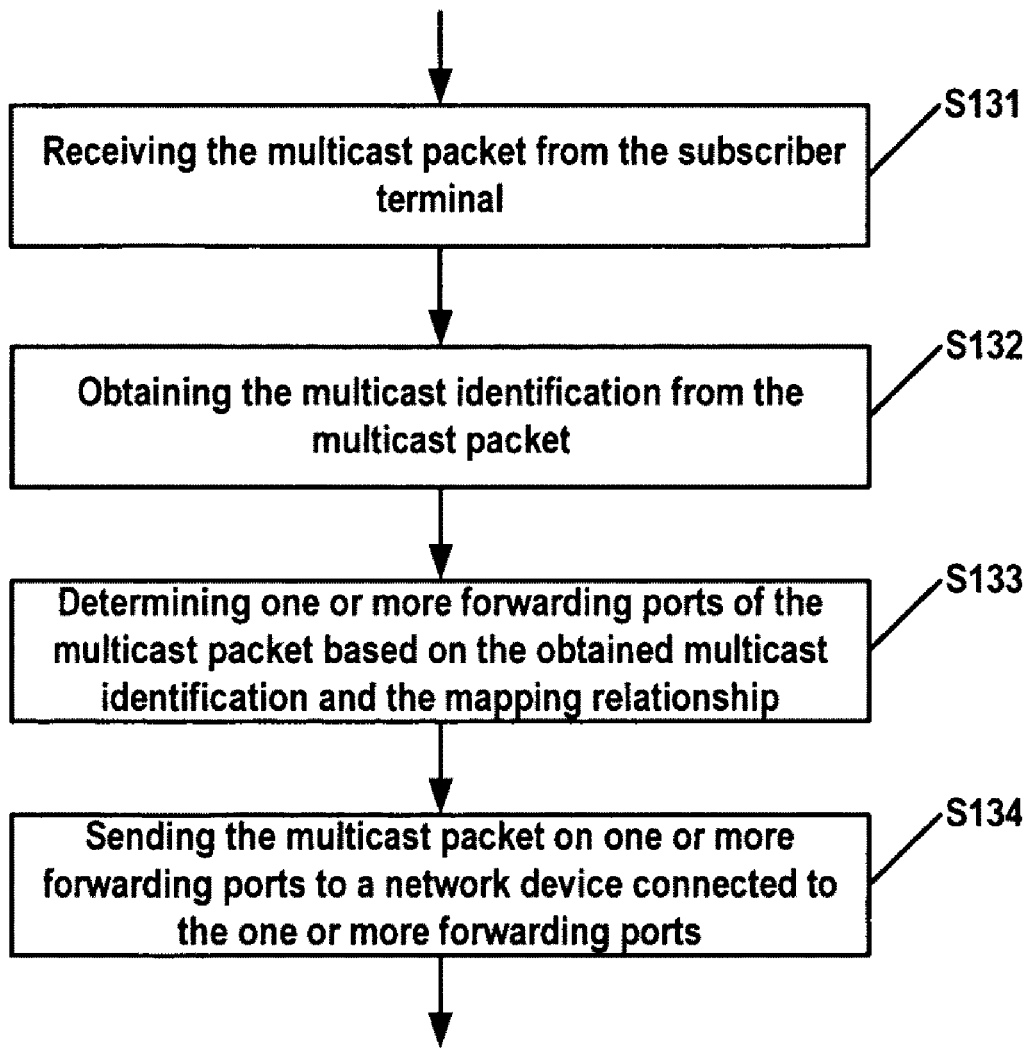
FIG. 10 shows a flow chart of a method for sending a multicast packet from a subscriber terminal in a network device of a communication network according to a specific embodiment of the present invention.

FIG. 10 shows a specific embodiment of step S13 as shown in FIG. 8. Firstly, at step S131, a multicast packet from the subscriber terminal is received. Secondly, at step S132, the multicast identification is obtained from the multicast packet. Then, at step S133, one or more forwarding ports of the multicast packet are determined based on the obtained multicast identification and the mapping relationship. Finally, at step S134, the multicast packet is sent on the one or more forwarding ports to the network device connected to the one or more forwarding ports.

When there are a plurality of logical topology trees in the network, different logical topology tree identifications are required to distinguish different logical topology trees. For a MSTI-based multicast packet forwarding mechanism, only one spanning tree is generated with the network device as the root node. A VLAN identification may be pre-stored in the network device, or the multicast management device, in response to the request for sending a multicast packet from the subscriber, notifies the network device of the VLAN identification and the multicast address. For a PVST-based multicast packet forwarding mechanism, different logical topology tree identifications are required to be assigned to different multicast processes. In response to the request for sending the multicast packet from the subscriber terminal, the multicast management device notifies the network device to assign different multicast addresses and the corresponding different VLAN identifications to different multicast processes.

Thus, when there are a plurality of logical topology trees in the network, the network device takes itself as a root node to generate a logical topology tree identified by a specific logical topology tree identification. After the logical topology tree is established, the network device belongs to other network device which sends a multicast query message to the logical topology tree on one or more ports connected to the logical topology tree, the query message including the identification of the logical topology tree.

Figure 11:
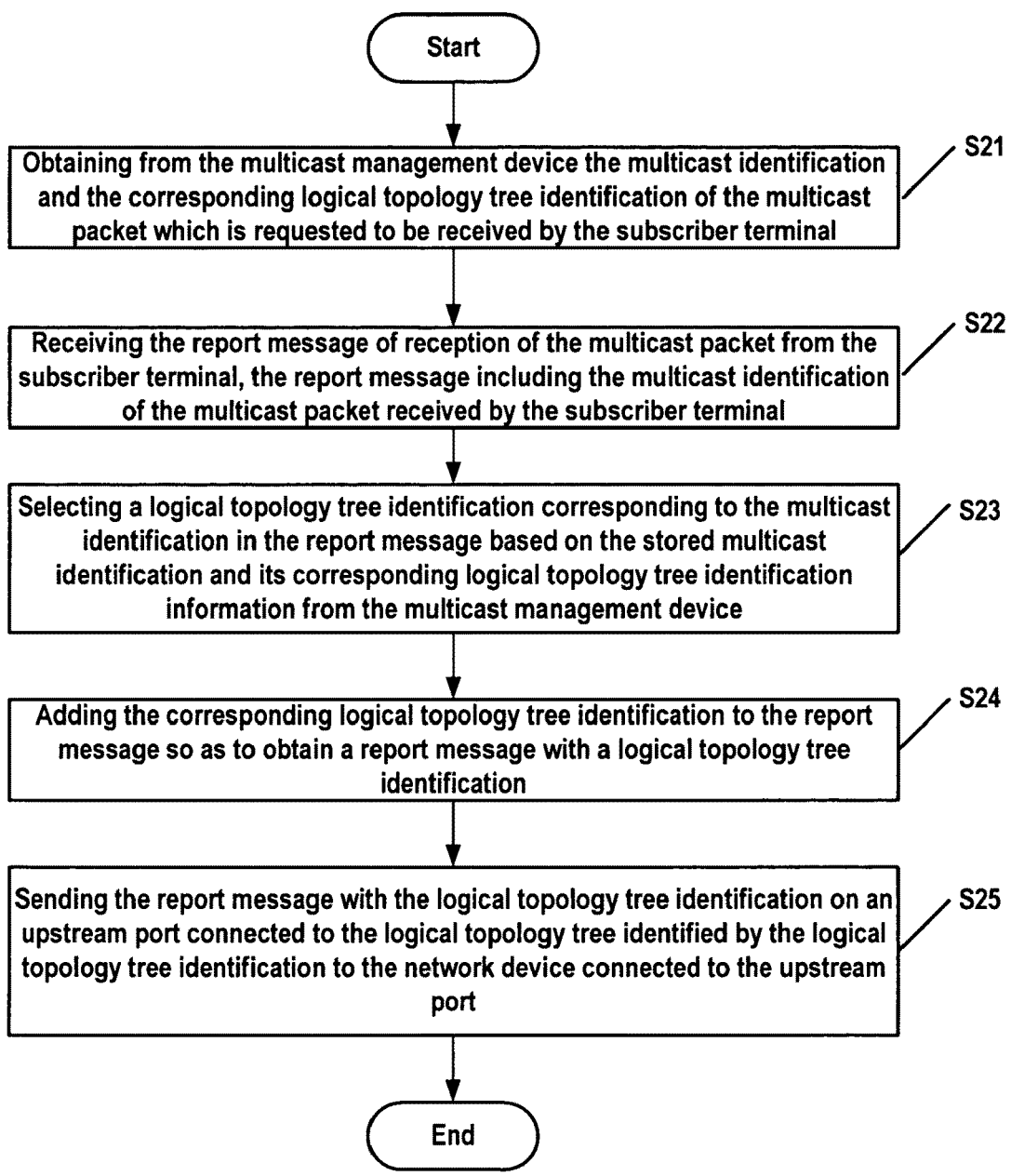
FIG. 11 shows a flow chart of a method in a network device of a communication network, for forwarding a message reporting reception of a multicast packet by a subscriber terminal accessed to the communication network via the network device according to a specific embodiment of the present invention.

FIG. 11 shows a flow chart of a method, in a network device of a communication network, for forwarding a message reporting reception of a multicast packet by a subscriber terminal accessed to the communication network via the network device according to a specific embodiment of the present invention.

Firstly, at step S21, the multicast identification and the corresponding logical topology tree identification of the multicast packet which is requested to be received by the subscriber terminal are obtained from the multicast management device.

Secondly, at step S22, the report message of reception of the multicast packet from the subscriber terminal is received, the report message including the multicast identification of the multicast packet received by the subscriber terminal.

Next, at step S23, a logical topology tree identification corresponding to the multicast identification in the report message is selected based on the stored multicast identification and its corresponding logical topology tree identification information from the multicast management device.

Then, at step S24, the corresponding logical topology tree identification is added to the report message so as to obtain a report message with a logical topology tree identification.

Finally, at step S25, the report message with the logical topology tree identification is sent on an upstream port connected to the logical topology tree identified by the logical topology tree identification to the network device connected to the upstream port. The upstream port here refers to a port connected to the logical topology tree and close to the root node of the logical topology tree.

It should be noted here that when the multicast address and its corresponding logical topology tree identification are pre-stored in the network device; the step S21 may be eliminated too; and at step S23, the logical topology tree identification corresponding to the multicast identification in the report message is selected based on the stored multicast identification and its corresponding logical topology tree identification information from the multicast management device.

Figure 12:
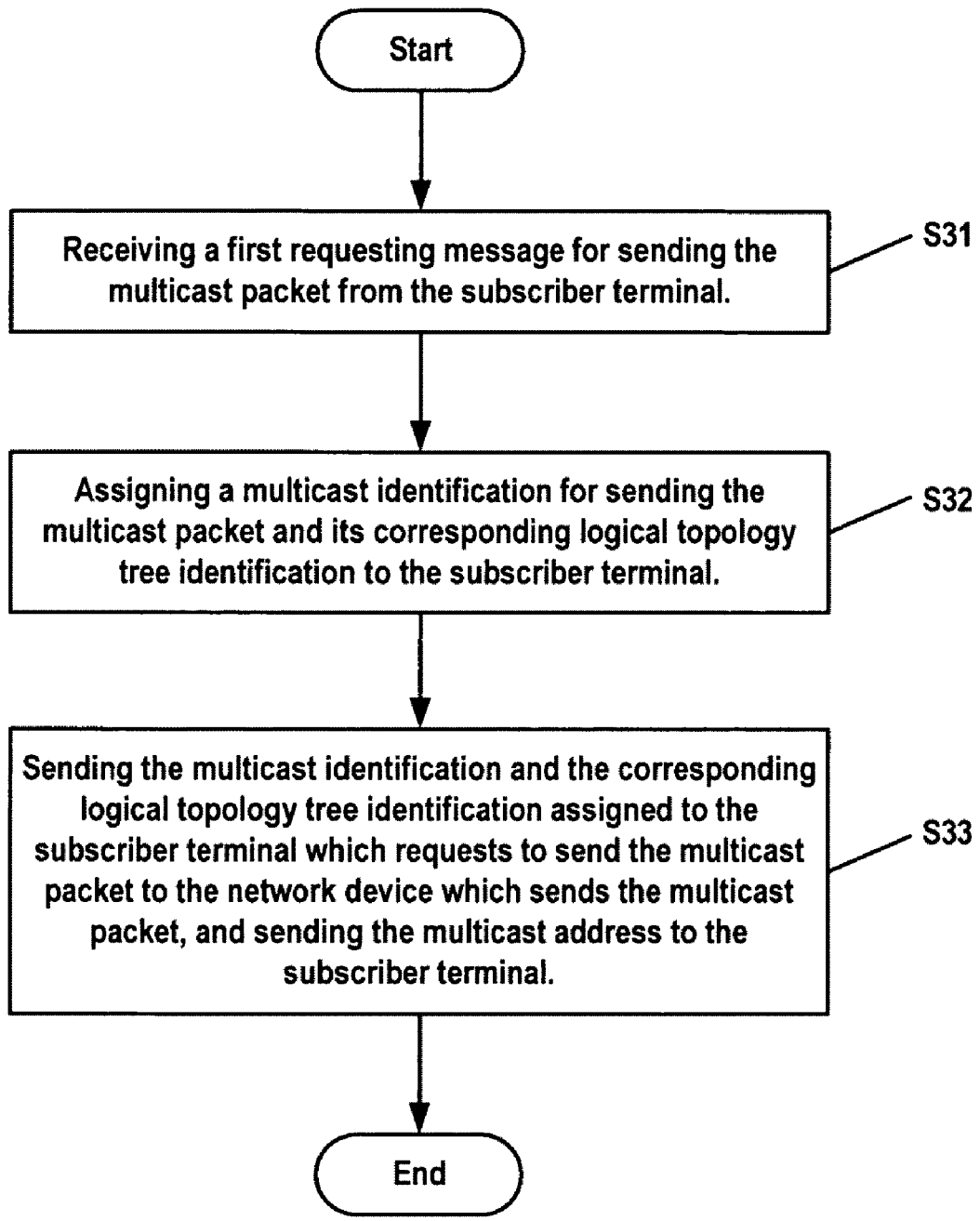
FIG. 12 shows a flow chart of a method for assisting a subscriber terminal to send a multicast packet in a multicast management device of a communication network according to a specific embodiment of the present invention.

FIG. 12 shows a flow chart of a method for assisting a subscriber terminal to send a multicast packet in a multicast management device of a communication network according to a specific embodiment of the present invention.

Firstly, at step S31, a first requesting message for sending the multicast packet from the subscriber terminal is received.

Then, at step S32, a multicast identification for sending the multicast packet and its corresponding logical topology tree identification are assigned to the subscriber terminal.

Finally, at step S33, the multicast identification and the corresponding logical topology tree identification assigned to the subscriber terminal which requests to send the multicast packet are sent to the network device which sends the multicast packet, and the multicast address is also sent to the subscriber terminal.

It should be noted here that, steps S31 and S32 are not essential steps to implement the present invention. For example, when the multicast address and its corresponding logical topology tree identification are pre-assigned to each subscriber, terminal, the multicast identification and its corresponding logical topology tree identification can be directly sent to the network device which sends the multicast packet, and the multicast address is sent to the subscriber terminals.

Preferably, after receiving the first requesting message from the subscriber terminal, the multicast management device can also authenticate the subscriber terminal, and the authentication process can be implemented by the multicast management device per se, or by a dedicated authentication server. The multicast management device obtains the authentication result, and will not send the assigned multicast identification and the corresponding logical topology tree identification to the network device which sends the multicast packet or send the multicast identification to the subscriber terminal unless the subscriber terminal passes the authentication.

Figure 13:
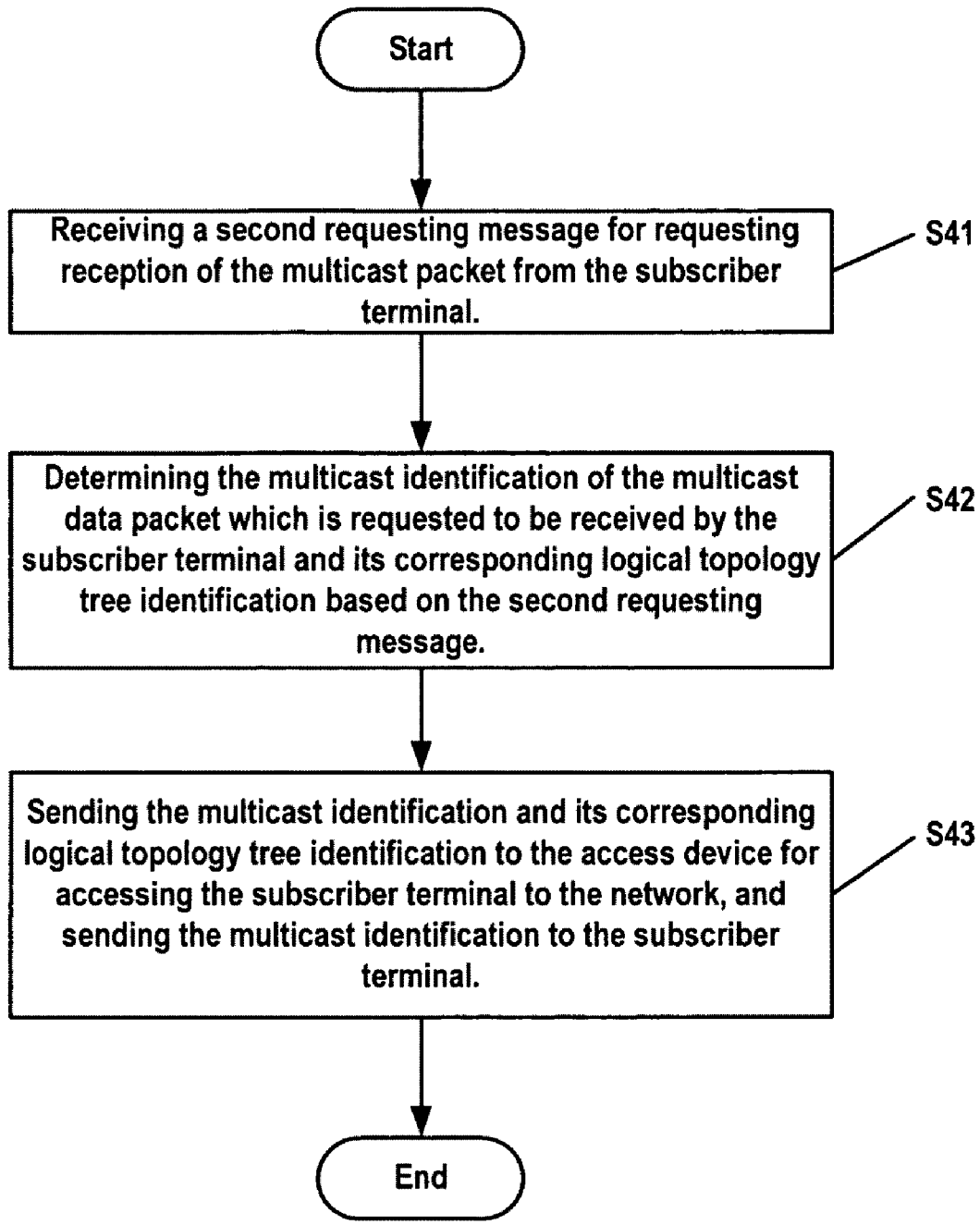
FIG. 13 shows a schematic diagram of a flow, chart of a method for assisting a subscriber terminal to send a multicast packet in a multicast management device of a communication network according to a specific embodiment of the present invention.

FIG. 13 shows a diagram of a flow chart of a method for assisting a subscriber terminal to send a multicast packet in a multicast management device of a communication network according to a specific embodiment of the present invention.

Firstly, at step S41, a second requesting message from the subscriber terminal for requesting reception of the multicast packet is received.

Then, at step S42, the multicast identification of the multicast data packet which is requested to be received by the subscriber terminal and its corresponding logical topology tree identification are determined based on the second requesting message.

Finally, at step S43, the multicast identification and its Corresponding logical topology tree identification are sent to the access device for accessing the .subscriber terminal to the network, and the multicast identification is sent to the subscriber terminal.

Preferably, after receiving the second requesting message from the subscriber terminal, the multicast management device can also authenticate the subscriber terminal. The authentication process can be implemented by the multicast management device per se, or by a dedicated authentication server. The multicast management device obtains the authentication result, and will not send the assigned multicast identification and the corresponding logical topology tree identification to the access device for accessing the subscriber terminal to the network or send the multicast identification to the subscriber terminal unless the subscriber terminal passes the authentication.

Figure 14:
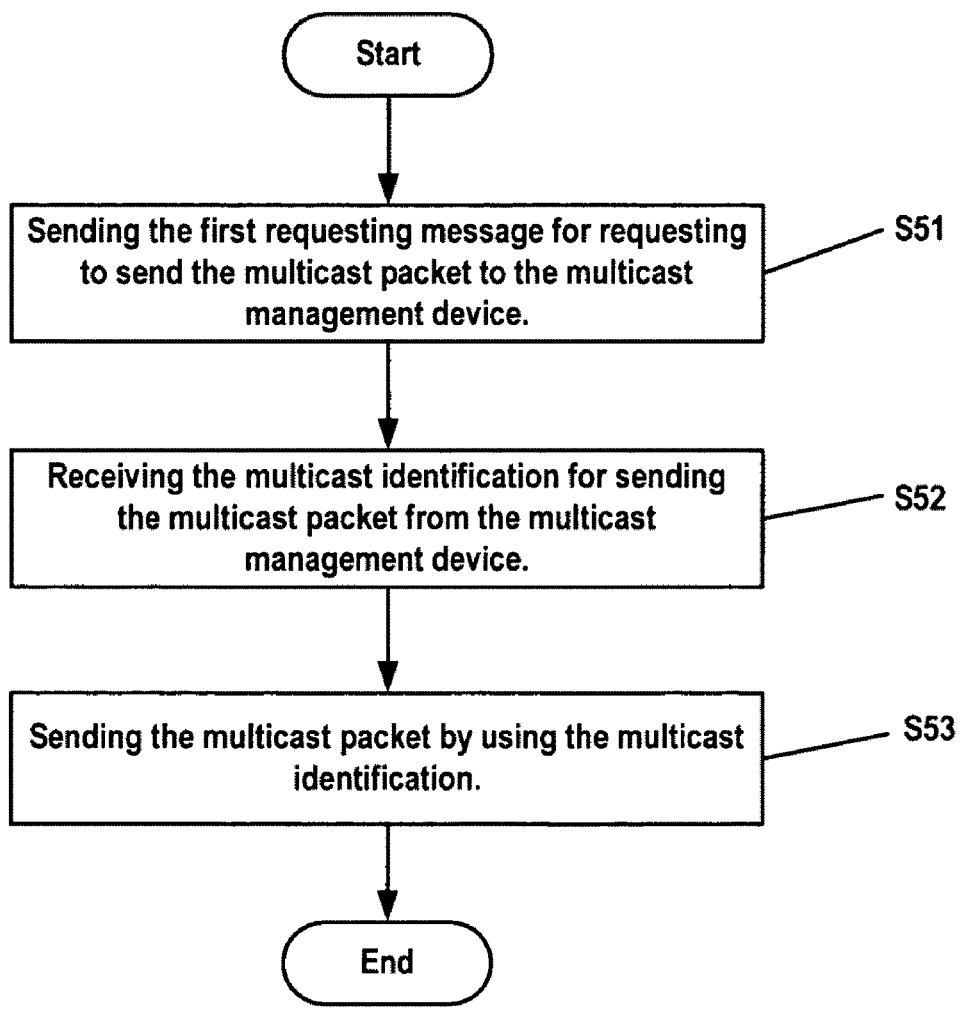
FIG. 14 shows a flow chart of a method for obtaining a multicast identification for sending a multicast packet in a subscriber terminal of a communication network according to a specific embodiment of the present invention.

FIG. 14 shows a flow chart of a method for obtaining a multicast identification for sending a multicast packet in a network device of a communication network according to a specific embodiment of the present invention.

Firstly, at step S51, the first requesting message for requesting to send the multicast packet is sent to the multicast management device.

Then, at step S52, the multicast identification for sending the multicast packet from the multicast management device is received.

Finally, at step S53, the multicast packet is sent by using the multicast identification.

Figure 15:
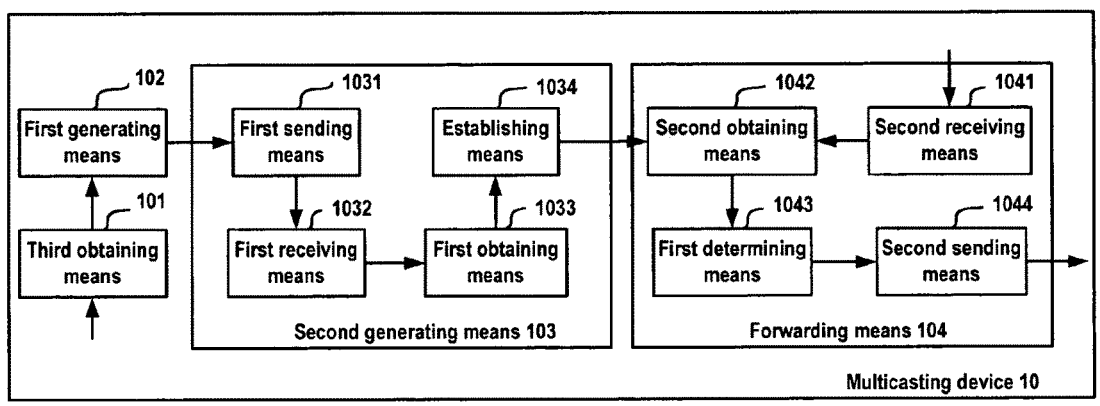
FIG. 15 shows a block diagram of the structure of a multicasting device for multicasting a multicast packet from a subscriber terminal in a network device of a communication network according to a specific embodiment of the present invention.

FIG. 15 shows a block diagram of the structure of a multicasting device for multicasting a multicast packet from a subscriber terminal in a network device of a communication network according to a specific embodiment of the present invention.

The multicasting device 10 comprises third obtaining means 101, first generating means 102, second generating means 103 and forwarding means 104, wherein the second generating means 103 comprises first sending means 1031, first receiving means 1032, first obtaining means 1033 and establishing means 1034; the forwarding means 104 comprising second receiving means 1041, second obtaining means 1042, first determining means 1043 and second sending means 1044. For the sake of conciseness, the multicasting device 10 includes many sub-devices included in many preferred embodiments, and the skilled in the art would appreciate under the teaching of the present application that only the first generating means 102, the second generating means 103 and the forwarding means 104 are essential means to implement the present invention, and the other sub-devices are optional ones.

Firstly, the first generating means 102 generates a logical topology tree with the network device as the root node. Then, the second generating means 103 generates a multicast tree on the logical topology tree generated by the first generating means 102 with the network device as the root node, and finally, the forwarding means 103 forwards the multicast packet on the multicast tree generated by the second generating means 103. The foregoing describes the circumstance of that the multicast device 10 voluntarily generates the logical topology tree and the multicast tree for the multicast data from the subscriber terminal. Preferably generation of the logical topology tree and the multicast tree can be established under the request by the subscriber terminal, or for example as shown in FIG. 6, after receiving the notification message from the multicast management device, the multicasting means 10 generates the logical topology tree and the multicast tree.

The process of the second generating means 103 generating the multicast tree on the logical topology tree generated by the first generating means 102 with the network device as the root node can be specifically implemented by the first sending means 1031, the first receiving means 1032, the first obtaining means 1033, and the establishing means 1034, respectively. Firstly, the first sending means 1031 sends a multicast query message on one or more ports connected to the logical topology tree to other network devices of the logical topology tree. Then, the first receiving means 1032 receives the report message of other network devices on the logical topology tree on reception of the multicast packet. And then, the first obtaining means 1033 obtains the multicast identification of the multicast packet received by other network devices from the reporting message. Finally, the establishing means 1034 establishes a mapping relationship between the port receiving the report message and the multicast identification to thereby generate the multicast tree. When the subscriber terminal which receives the multicast packet voluntarily issues the reporting message, the first sending means 1031 can be eliminated too.

The process of the forwarding means 104 forwarding the multicast packet on the multicast tree generated by the second generating means 103 can be specifically implemented by the second receiving means 1041, the second obtaining means 1042, the first determining means 1043, and the second sending means 1044, respectively.

Firstly, the second receiving means 1041 receives the multicast packet from the subscriber terminal. Secondly, the second obtaining means 1042 obtains the multicast identification from the multicast packet. Then, the first determining means 1043 determines one or more forwarding ports for the multicast packet based on the obtained multicast identification and the mapping relationship. Finally, the second sending means 1044 sends the multicast packet on the one or more forwarding ports to the network device connected to the one or more forwarding ports.

When there are a plurality of logical topology trees in the network, different logical topology tree identifications are required to distinguish different logical topology trees. For a MSTI-based multicast packet forwarding mechanism, only one spanning tree is generated with the network device as the root node. A VLAN identification may be re-stored in the network device, or the multicast management device, in response to the request for sending a multicast packet from the subscriber, notifies the network device of the VLAN identification and the multicast address. For a PVST-based multicast packet forwarding mechanism, different logical topology tree identifications are required to be assigned to different multicast processes. In response to the request for sending a multicast packet from the subscriber terminal, the multicast management device notifies the network device to assign different multicast addresses and the corresponding different VLAN identifications to different multicast processes.

Thus, when there are a plurality of logical topology trees in the network, the first generating means 102 generates a logical topology tree identified by a specific logical topology tree identification with the network device as the root node. After the logical topology tree is established, the first sending means 1031 belongs to other network device which sends a multicast query message to the logical topology tree on one or more ports connected to the logical topology tree, the query message including the identification of the logical topology tree.

Figure 16:
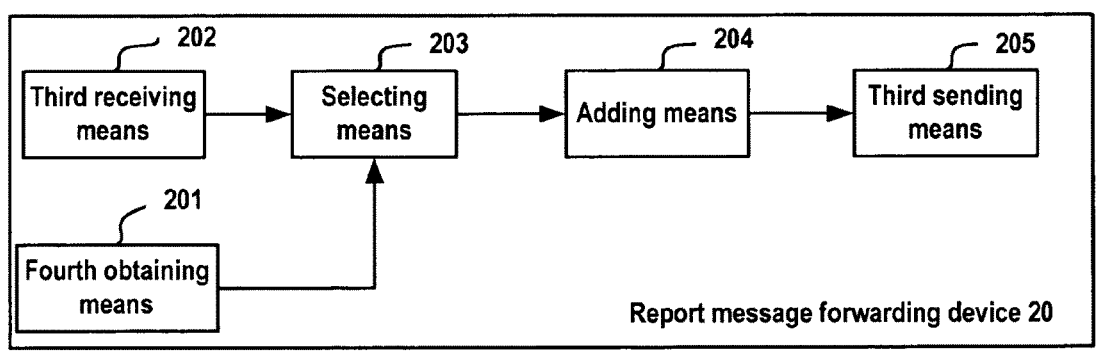
FIG. 16 shows a block diagram of the structure of a report message forwarding device in a network device of a communication network for forwarding a message reporting reception of the multicast packet by the subscriber terminal accessed to the communication network via the network device according to a specific embodiment of the present invention.

FIG. 16 shows a block diagram of the structure of a report message forwarding device in a network device of a communication network for forwarding a message reporting reception of the multicast packet by the subscriber terminal accessed to the communication network via the network device according to a specific embodiment of the present invention.

The report message forwarding device comprises fourth obtaining means 201, third receiving means 202, selecting means 203, adding means 204, and third sending means 205.

Firstly, the fourth obtaining means 201 obtains the multicast identification of the multicast packet which is requested to be received by the subscriber terminal and the corresponding logical topology identification from the multicast management device.

Secondly, the third receiving means 202 receives the report message from the subscriber terminal on reception of the multicast packet, the report message containing the multicast identification of the multicast packet received by the subscriber terminal.

Next, the selecting means 203 selects a logical topology tree identification corresponding to the multicast identification in the report message based on the stored multicast identification from the multicast management device and the corresponding logical topology tree identification information.

Then, the adding means 204 adds the corresponding logical topology tree identification to the report message so as to obtain the report message with the logical topology identification.

Finally, the third sending means 205 sends the report message with the logical topology identification on the upstream port of the logical topology tree identified by the logical topology tree identification to the network device connected to the upstream port. The upstream port here refers to the port connected to the logical topology tree and close to the root node of the logical topology tree.

It should be noted that when the multicast address and its corresponding logical topology tree identification is pre-stored in the network device, the fourth obtaining means 201 can also be eliminated, and the selecting means 203 selects a logical topology identification corresponding to the multicast identification in the report message based on the pre-stored multicast identification and its corresponding logical topology tree identification information.

Figure 17:
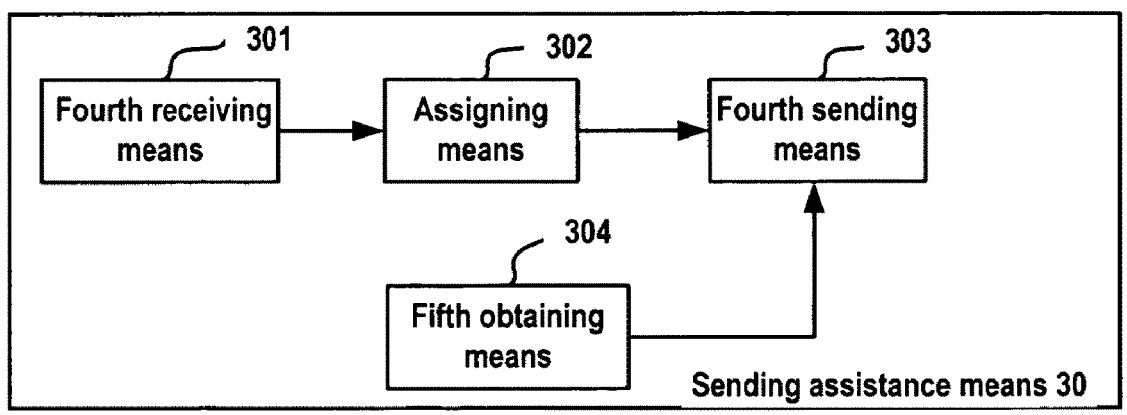
FIG. 17 shows a block diagram of the structure of a sending assistance device 30 for assisting a subscriber terminal in sending a multicast packet in a multicast management device of a communication network according to a specific embodiment of the present invention.

FIG. 17 shows a block diagram of the structure of a sending assistance device 30 for assisting a subscriber terminal in sending a multicast packet in a multicast management device of a communication network according to a specific embodiment of the present invention. The sending assistance device 30 comprises fourth receiving means 301, assigning means 302, fourth sending means 303, and fifth obtaining means 304. For the sake of conciseness, the sending assistance device 30 includes many sub-devices contained in many preferred embodiments, and the skilled in the art would appreciate under the teaching of the present application that only the fourth sending means 303 therein is essential means for implementing the present invention, and the other sub-devices are optional ones.

Firstly, the fourth receiving means receives the first request message from the subscriber terminal for requesting to send the multicast packet.

Then, the assigning means 302 assigns a multicast identification for sending the multicast packet and the corresponding logical topology tree identification to the subscriber terminal.

Finally, the fourth sending means 303 sends the multicast identification assigned to the subscriber terminal that requests to send the multicast packet and the corresponding logical topology tree identification to the network device which sends the multicast packet, and sends the multicast address to the subscriber terminal.

It should be noted here that, the fourth receiving means 301 and the assigning means 302 are not essential means to implement the present invention. For example, when the multicast address and its corresponding logical topology tree identification are pre-assigned to each subscriber terminal, the fourth sending means 303 can directly send the multicast identification and its corresponding logical topology tree identification to the network device which sends the multicast packet, and send the multicast address to the subscriber terminals.

Preferably, after receiving the first requesting message from the subscriber terminal, the multicast management device can also authenticate the subscriber terminal, and the authentication process can be implemented by the multicast management device, per se, or by a dedicated authentication server. The fifth obtaining means 304 obtains the authentication result, and the fourth sending means 303 will not send the assigned multicast identification and the corresponding logical topology tree identification to the network device which sends the multicast packet or send the multicast identification to the subscriber terminal unless the subscriber terminal passes the authentication.

Figure 18:
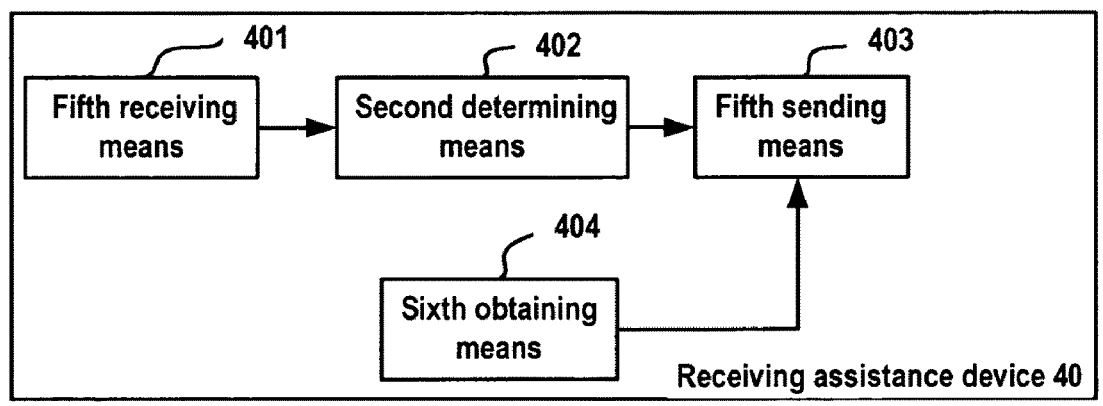
FIG. 18 shows a block diagram of the structure of a receiving assistance device 40 for assisting a subscriber terminal in receiving a multicast packet in a multicast management device of a communication network according to a specific embodiment of the present invention.

FIG. 18 shows a block diagram of the structure of a receiving assistance device 40 for assisting a subscriber terminal in receiving a multicast packet in a multicast management device of a communication network according to a specific embodiment of the present invention. The receiving assistance device 40 comprises fifth receiving means 401, second determining means 402, fifth sending means 403 and sixth obtaining means 404. For the sake of conciseness, the sending assistance device 40 includes many sub-devices contained in many preferred embodiments, and the skilled in the art would appreciate, under the teaching of the present application, that the sixth obtaining means 404 is not essential to implement the present invention.

Firstly, the fifth receiving means 401 receives the second requesting message from the subscriber terminal for requesting to receive the multicast packet.

Then, the second determining means 402 determines the multicast identification of the multicast packet which is requested to be received by the subscriber terminal and the corresponding logical topology tree identification based on the second requesting message.

Finally, the fifth sending means 403 sends the multicast identification and its corresponding logical topology tree identification to the access device for accessing the subscriber terminal to the network and sends the multicast identification to the subscriber terminal.

Preferably, after receiving the second requesting message from the subscriber terminal, the multicast management device can also authenticate the subscriber terminal. The authentication process can be implemented by the multicast management device per se, or by a dedicated authentication server. The sixth obtaining means 404 obtains the authentication result, and the fifth sending means 403 will not send the assigned multicast identification and the corresponding logical topology tree identification to the access device for accessing the subscriber terminal to the network or send the multicast identification to the subscriber terminal unless the subscriber terminal passes the authentication.

Figure 19:
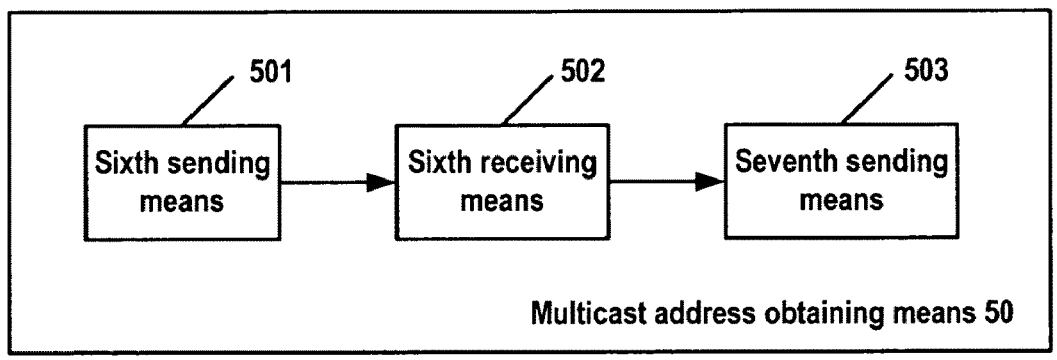
FIG. 19 shows a block diagram of the structure of a multicast identification obtaining means in a user terminal of the communication network for obtaining a multicast identification for sending a multicast packet according to a specific embodiment of the, present invention.

FIG. 19 shows a block diagram of the structure of a multicast identification obtaining means in a user terminal of the communication network for obtaining a multicast identification for sending a multicast packet according to a specific embodiment of the present invention. The multicast identification obtaining means 50 comprises sixth sending means 501, sixth receiving means 502, and seventh sending means 503.

Firstly, the sixth sending means 501 sends to the multicast management device the first requesting message for requesting to send the multicast packet.

Secondly, the sixth receiving means 502 receives the multicast identification from the multicast management device for sending the multicast packet.

Finally, the seventh sending means 503 sends the multicast packet by using the multicast identification.

The foregoing describes the specific embodiments of the present invention. It should be understood that the present invention is not limited to the above specific embodiments, and the skilled in the art can make various alterations or modifications within the scope of the appended claims.

The invention claimed is:

1. A method for multicasting a multicast packet from a subscriber terminal in a network device in a communication network, wherein the communication network includes an access network and a local area network; when the communication network is an access network, the network device includes an access device through which the subscriber terminal sending the multicast packet is accessed to the network, the method comprising:
   generating a logical topology tree with the network device as a root node;
   generating a multicast tree on the logical topology tree with the network device as the root node, the generating the multicast tree including,
      receiving, by the network device, a report message on the logical topology tree on reception of the multicast packet,
      obtaining from the report message a multicast identification of the subscriber terminal for the multicast packet, and
      establishing a mapping relationship between a port configured to receive the report message and the multicast identification of the subscriber terminal to thereby generate the multicast tree; and
   forwarding the multicast packet on the multicast tree.

2. A method according to claim 1, wherein before the receiving a report message
   sending a multicast query message on one or more ports connected to the logical topology tree to other network devices on the logical topology tree.

3. A method according to claim 2, wherein the generating the logical topology tree further comprises:
   Generating the logical topology tree identified by a specific logical topology tree identification; wherein the logical topology tree identification is included in the multicast query message.

4. A method according claim 1, wherein the forwarding the multicast packet comprises:
   receiving the multicast packet from the subscriber terminal;
   obtaining the multicast identification from the multicast packet;

determining one or more forwarding ports to the multicast packet based on the obtained multicast identification and mapping relationship; and sending the multicast packet on one or more forwarding ports to a network device connected to the one or more forwarding ports.

5. A method according to claim 3, further comprising before the generating the logical topology tree:

obtaining from a multicast management device the multicast identification for sending the multicast packet assigned by the multicast management device to the subscriber terminal for sending the multicast packet and corresponding logical topology tree identification.

6. A method, in a network device of a communication network, for forwarding a report message on reception of a multicast packet by a subscriber terminal which is accessed to the communication network via the network device, the method comprising:

receiving, by the network device, the report message on reception of the multicast packet from the subscriber terminal, the report message including a multicast identification of the subscriber terminal for the multicast packet received;

selecting a logical topology tree identification corresponding to the multicast identification of the subscriber terminal in the report message based on a determined multicast identification and a corresponding logical topology tree identification information;

adding the corresponding logical topology tree identification to the report message to thereby obtain the report message with the logical topology tree identification; and sending the report message with the logical topology tree identification on an upstream port connected to the logical topology tree identified by the logical topology tree identification to the network device connected to the upstream port.

7. A method according to claim 6, further comprising before the receiving the report message:

obtaining from a multicast management device the multicast identification of the multicast packet which is requested to be received by the subscriber terminal and corresponding logical topology tree identification.

8. A multicasting device for multicasting a multicast packet from a subscriber terminal in a network device in a communication network, wherein the communication network includes an access network and a local area network; when the communication network is an access network, the network device includes an access device through which the subscriber terminal sending the multicast packet is accessed to the network, the multicast device comprising:

a first generator configured to generate a logical topology tree with the network device as a root node;

a second generator configured to generate a multicast tree on the logical topology tree with the network device as the root node;

a first receiver configured to receive a report message on the logical topology tree on reception of the multicast packet, the first receiver being the network device;

a first obtainer configured to obtain from the report message a multicast identification of the subscriber terminal for the multicast packet;

a mapping unit establish configured to establish a mapping relationship between a port configured to receive the report message and the multicast identification of the subscriber terminal to thereby generate the multicast tree; and a forwarding unit configured to forward the multicast packet on the multicast tree.

9. A multicasting device according to claim 8, wherein the second generator further includes:

a first sender configured to send a multicast query message on one or more ports connected to the logical topology tree to other network devices on the logical topology tree.

10. A multicasting device according to claim 9, wherein the first generator is further configured to generate the logical topology tree identified by a specific logical topology tree identification; wherein the logical topology tree identification is included in the multicast query message.

11. A multicasting device according to claim 8, wherein the forwarding unit includes:

a second receiver configured to receive the multicast packet from the subscriber terminal;

a second obtainer configured to obtain the multicast identification from the multicast packet;

a first determining unit configured to determine one or more forwarding ports to the multicast packet based on the obtained multicast identification and the mapping relationship; and a second sender configured to send the multicast packet on one or more forwarding ports to a network device connected to the one or more forwarding ports.

12. A multicasting device according to claim 10, further comprising:

a third obtaining unit configured to obtain from a multicast management device the multicast identification for sending the multicast packet assigned by the multicast management device to the subscriber terminal for sending the multicast packet and corresponding logical topology tree identification.

13. A report message forwarding device in a network device of a communication network for forwarding a report message on reception of a multicast packet by a subscriber terminal which is accessed to the communication network via the network device, comprising:

a first receiver configured to receive the report message on reception of the multicast packet from the subscriber terminal, the first receiver being the network device, the report message including a multicast identification of the subscriber terminal for the multicast packet;

a selecting unit configured to select a logical topology tree identification corresponding to the multicast identification of the subscriber terminal in the report message based on a determined multicast identification and a corresponding logical topology tree identification information;

an adding unit configured to add the corresponding logical topology tree identification to the report message to thereby obtain the report message with the logical topology tree identification; and a sending unit configured to send the report message with the logical topology tree identification on an upstream port connected to the logical topology tree identified by the logical topology tree identification to the network device connected to the upstream port.

14. A report message forwarding device according to claim 13, further comprising:

an obtaining unit configured to obtain from a multicast management device the multicast identification of the multicast packet which is requested to be received by the subscriber terminal and the corresponding logical topology tree identification.

* * * * *